United States Patent
Sun et al.

(10) Patent No.: US 8,059,413 B2
(45) Date of Patent: Nov. 15, 2011

(54) COMPUTER HOUSING

(75) Inventors: Wei-Chih Sun, Taipei (TW); Yu-Cheng Liang, Taipei (TW); Chien-Chi Chen, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 156 days.

(21) Appl. No.: 12/385,182

(22) Filed: Apr. 1, 2009

(65) Prior Publication Data

US 2009/0316346 A1 Dec. 24, 2009

(30) Foreign Application Priority Data

Jun. 21, 2008 (CN) .......................... 2008 1 0028990

(51) Int. Cl.
*H05K 7/14* (2006.01)
(52) U.S. Cl. ................. 361/732; 361/679.02; 361/679.4; 361/737; 312/223.1
(58) Field of Classification Search ............... 361/679.4, 361/752, 728, 740, 755, 679.02, 737, 732; 312/223.1–223.2
See application file for complete search history.

(56) References Cited

U.S. PATENT DOCUMENTS

| | | | | |
|---|---|---|---|---|
| 5,835,346 A * | 11/1998 | Albani et al. | ............... | 361/679.4 |
| 6,549,398 B2 * | 4/2003 | Chen | ........................ | 361/679.58 |
| 6,937,467 B2 * | 8/2005 | Hsu | ........................... | 361/679.41 |
| 7,326,077 B2 * | 2/2008 | Shih et al. | ..................... | 439/372 |
| 7,573,704 B2 * | 8/2009 | Chen et al. | ............... | 361/679.32 |

\* cited by examiner

*Primary Examiner* — Jinhee Lee
*Assistant Examiner* — Ingrid Wright
(74) *Attorney, Agent, or Firm* — Rosenberg, Klein & Lee

(57) ABSTRACT

A computer housing is adapted for mounting an interface card, and includes a housing body and a positioning device. The housing body includes a mounting portion and a first fixing portion disposed adjacent to the mounting portion. The positioning device includes a positioning component having a second fixing portion. The positioning component is pivotable relative to the housing body between a card retaining position, where the second fixing portion engages the first fixing portion and the positioning component is disposed to be capable of blocking removal of the interface card from the mounting portion, and a card releasing position, where the second fixing portion is disengaged from the first fixing portion and the positioning component is disposed to permit removal of the interface card from the mounting portion.

6 Claims, 3 Drawing Sheets

COMPUTER HOUSING

CROSS-REFERENCE TO RELATED APPLICATION

This application claims priority of Chinese Application No. 200810028990.4, filed on Jun. 21, 2008.

BACKGROUND OF THE INVENTION

1. Field of the Invention

The invention relates to a computer housing, more particularly to a computer housing that uses a pivotable positioning component instead of screws to fasten an interface card to a housing body.

2. Description of the Related Art

A computer housing is generally formed with a plurality of mounting hole portions for mounting various types of interface cards, such as a video card, an audio card, a network card, etc. As shown in FIG. 1, a conventional computer housing 1 has a panel 11 formed with a plurality of vertical mounting hole portions 12. As shown in FIG. 2, another conventional computer housing 2 has a panel 21 formed with a vertical mounting hole portion 211, and a frame 22 assembled to the panel 21 and formed with a plurality of horizontal mounting hole portions 221. The interface cards (not shown) are secured to the mounting hole portions 12, 211, 221 of the computer housings 1, 2 with the use of screws (not shown), which is inconvenient and time-consuming.

SUMMARY OF THE INVENTION

Therefore, the object of the present invention is to provide a computer housing adapted for mounting interface cards thereon without using screws and which can be fabricated at a relatively low cost.

According to the present invention, a computer housing is adapted for mounting an interface card and comprises a housing body and a positioning device. The housing body includes a mounting portion adapted for mounting of the interface card, and a first fixing portion disposed adjacent to the mounting portion. The positioning device includes a positioning component that is pivoted to the housing body and that has a second fixing portion. The positioning component is pivotable relative to the housing body between a card retaining position, where the second fixing portion engages the first fixing portion and the positioning component is disposed to be capable of blocking removal of the interface card from the mounting portion, and a card releasing position, where the second fixing portion is disengaged from the first fixing portion and the positioning component is disposed to permit removal of the interface card from the mounting portion.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
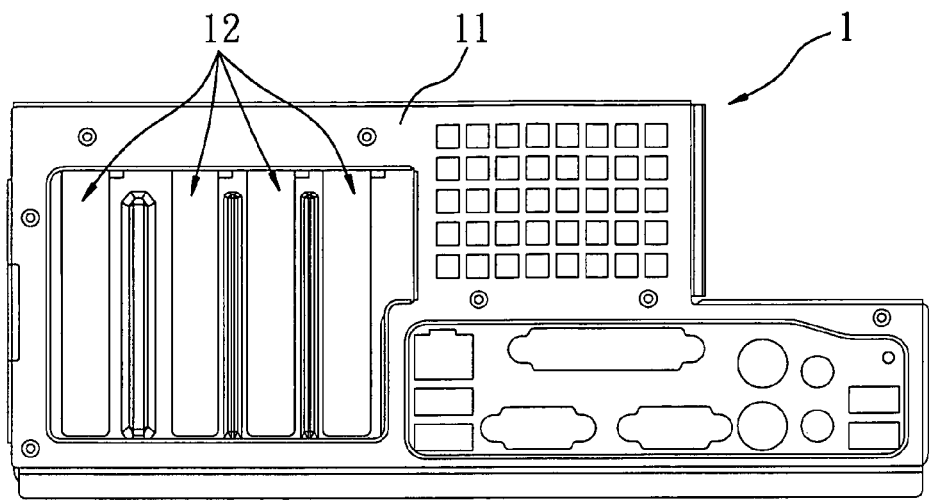
FIG. 1 is a front view of a panel of a conventional computer housing.
Figure 2:
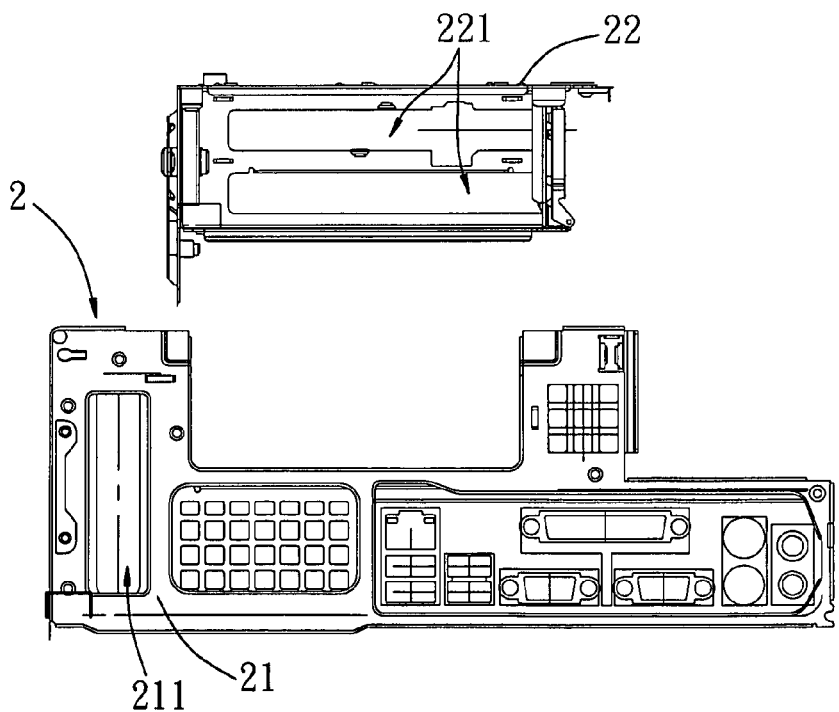
FIG. 2 is an exploded view showing a panel and a frame of another conventional computer housing.
Figure 3:
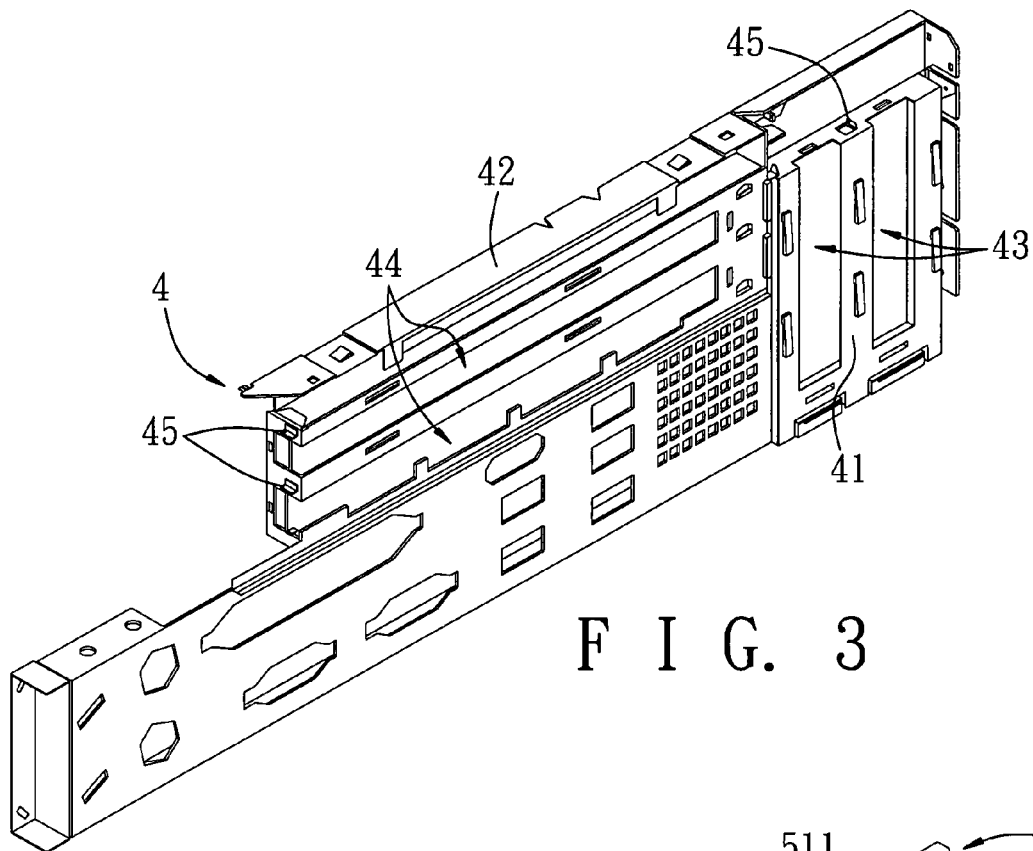
FIG. 3 is a perspective view of a housing body of a preferred embodiment of a computer housing of the present invention.
Figure 4:
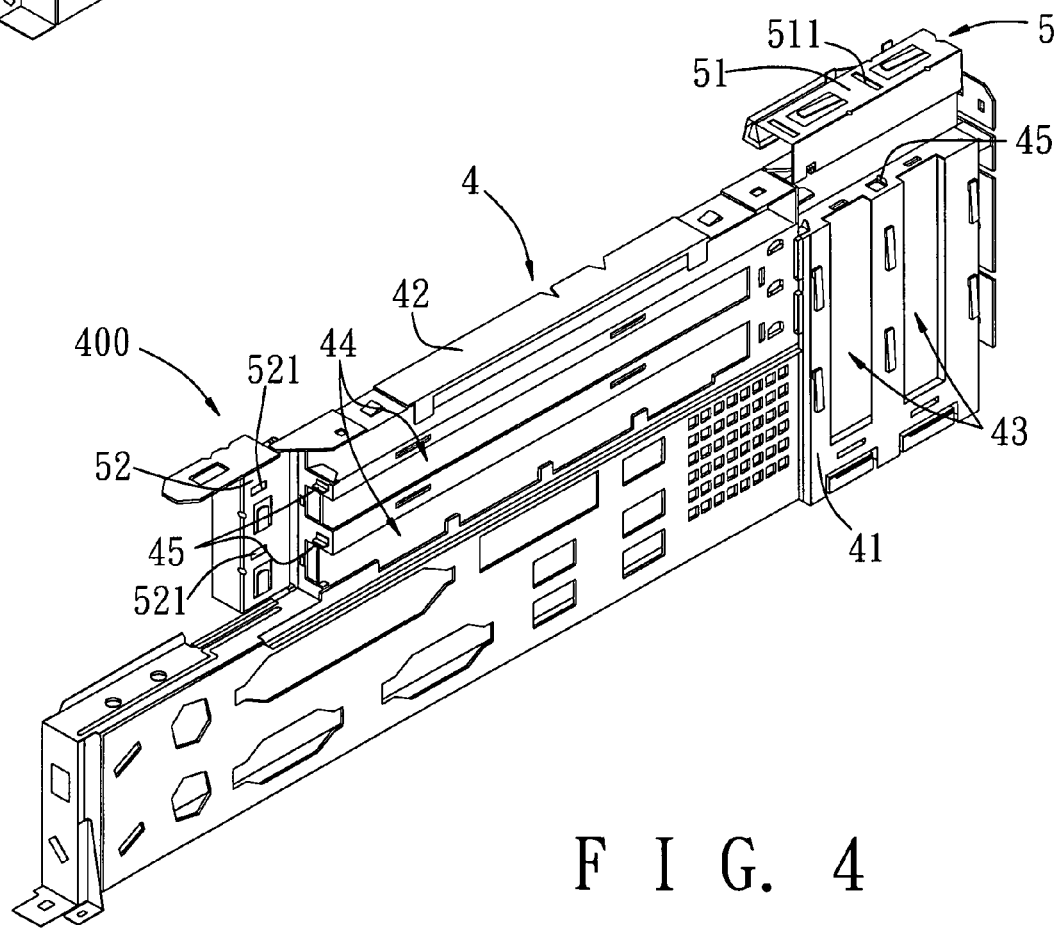
FIG. 4 is another perspective view of the preferred embodiment, illustrating a positioning device mounted on the housing body.
Figure 5:
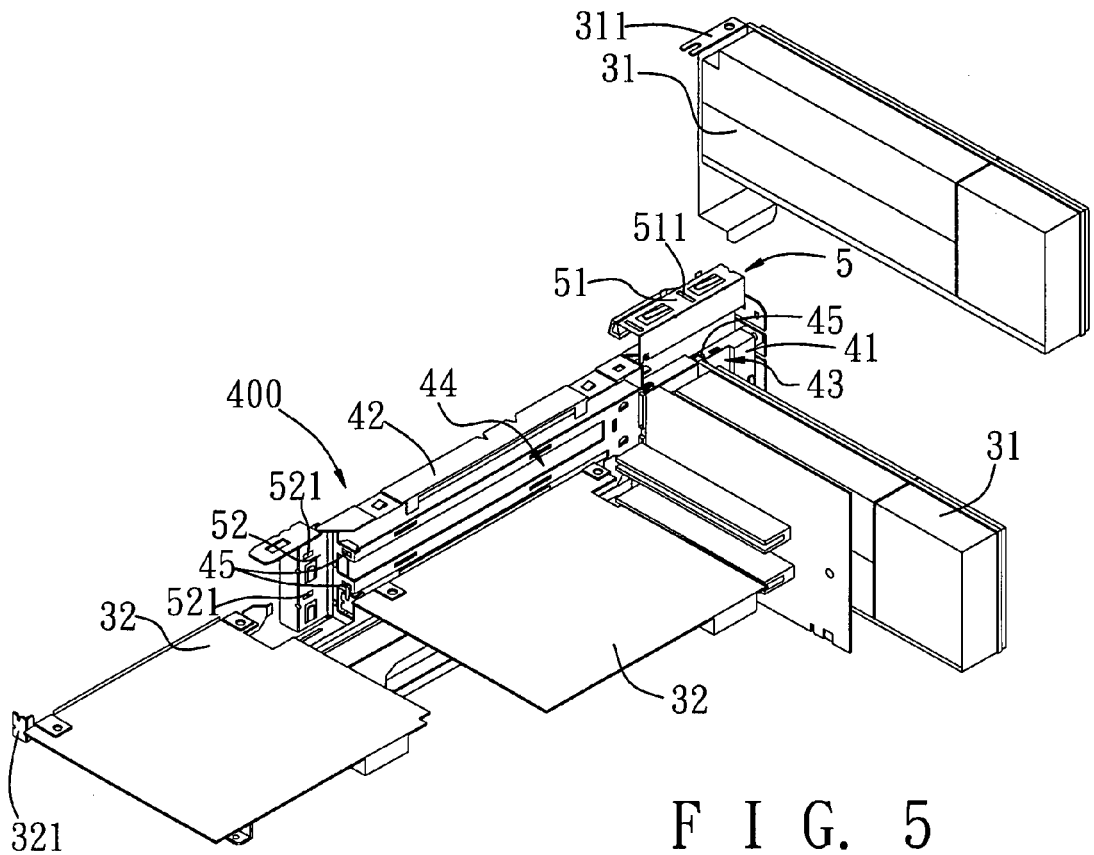
FIG. 5 is a perspective view to illustrate how interface cards are mounted on the housing body of the preferred embodiment.

A preferred embodiment of a computer housing 400 according to the present invention is shown in FIGS. 3, 4 and 5. A plurality of first and second interface cards 31, 32 may be mounted on the computer housing 400, wherein the first interface cards 31 are vertical interface cards, and the second interface cards 32 are horizontal interface cards. Each of the first and second interface cards 31, 32 may be a video card, an audio card, a network card, etc.

The computer housing 400 comprises a housing body 4 and a positioning device 5. The housing body 4 includes a first panel part 41 integrally formed with a plurality of first mounting portions 43, a second panel part 42 disposed on one side of the first panel part 41 and integrally formed with a plurality of second mounting portions 44, and a plurality of first fixing portions 45. In the preferred embodiment, the first mounting portions 43 and the second mounting portions 44 extend in directions perpendicular to each other. Each of the first mounting portions 43 is a vertical mounting hole portion for mounting of one of the first interface cards 31. Each of the second mounting portions 44 is a horizontal mounting hole portion for mounting of one of the second interface cards 32. In this embodiment, the number of the first fixing portions 45 is three. One of the first fixing portions 45 is disposed on a top end of the first panel part 41. The other two of the first fixing portions 45 are disposed on one end of the second panel part 42 that is opposite to the first panel part 41.

Figure 6:
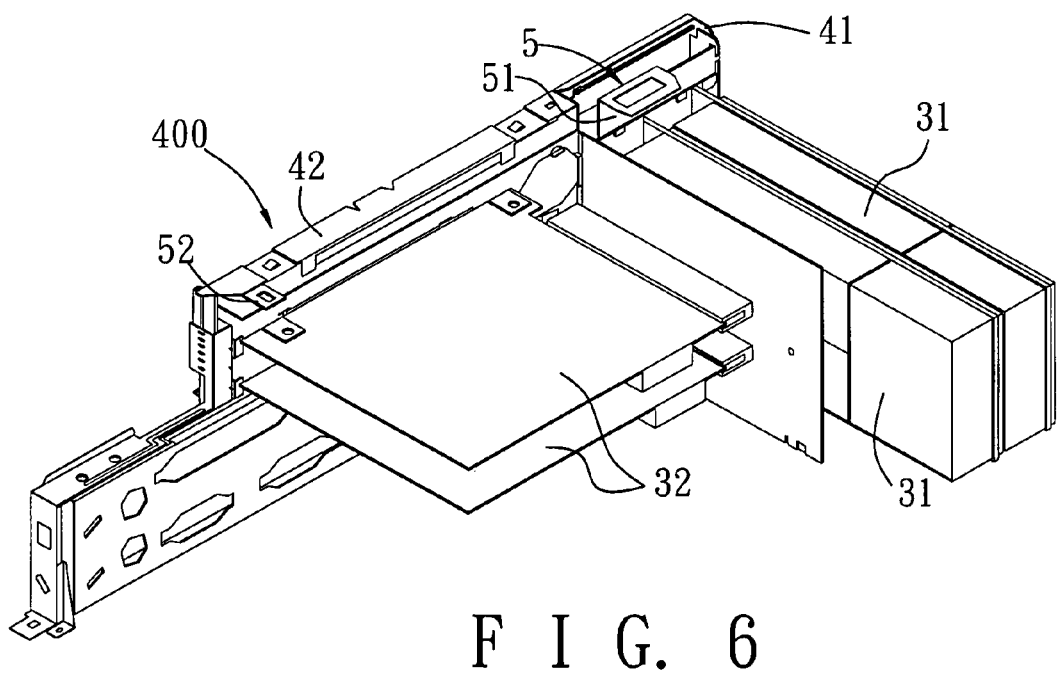
FIG. 6 is a perspective view of the preferred embodiment with interface cards mounted on the housing body thereof.

The positioning device 5 includes first and second positioning components 51, 52 that are pivoted to the housing body 4 and that respectively have second fixing portions 511, 521. The first positioning component 51 is pivoted to a top end of the first panel part 41 and is pivotable relative to the housing body 4 between a card retaining position (see FIG. 6), where the second fixing portion 511 thereof engages the first fixing portion 45 on the first panel part 41 and the first positioning component 51 is disposed to be capable of blocking removal of the first interface cards 31 from the first mounting portions 43, and a card releasing position (see FIG. 5), where the second fixing portion 511 thereof is disengaged from the first fixing portion 45 on the first panel part 41 and the first positioning component 51 is disposed to permit removal of the first interface cards 31 from the first mounting portions 43. In particular, the first positioning component 51 abuts against a bracket part 311 of each of the first interface cards 31 so as to prevent removal of the bracket part 311 from a wall section of the respective first mounting portion 43 when the first positioning component 51 is at the card retaining position.

The second positioning component 52 is pivoted to the end of the second panel part 42 that is opposite to the first panel part 41, and is pivotable relative to the housing body 4 between a card retaining position (see FIG. 6), where the second fixing portions 521 thereof respectively engage the first fixing portions 45 on the second panel part 42 and the second positioning component 52 is disposed to be capable of blocking removal of the second interface cards 32 from the second mounting portions 44, and a card releasing position (see FIG. 5), where the second fixing portions 521 thereof are disengaged from the first fixing portions 45 on the second panel part 42 and the second positioning component 52 is disposed to permit removal of the second interface cards 32 from the second mounting portions 44. In particular, the second positioning component 52 abuts against a bracket part 321 of each of the second interface cards 32 so as to prevent removal of the bracket part 321 from a wall section of the respective second mounting portion 44 when the second positioning component 52 is at the card retaining position.

In this embodiment, the first fixing portions 45 are engaging protrusions, while the second fixing portions 511, 521 are engaging holes. In other embodiments, the first fixing portions 45 may be engaging holes, while the second fixing portions 511, 521 may be engaging protrusions.

To sum up, the positioning device 5 in the preferred embodiment of the computer housing 400 of this invention includes pivotable positioning components 51, 52 that are operable to block or permit removal of the interface cards 31, 32 from the mounting portions 43, 44 without using screws such that mounting and removal of the interface cards 31, 32 are convenient to conduct. Moreover, by forming the first and second mounting portions 43, 44 integrally on the first and second panel parts 41, 42 of the housing body 4, fabrication costs of the computer housing 400 can be reduced.

While the present invention has been described in connection with what is considered the most practical and preferred embodiment, it is understood that this invention is not limited to the disclosed preferred embodiment but is intended to cover various arrangements included within the spirit and scope of the broadest interpretation so as to encompass all such modifications and equivalent arrangements.

What is claimed is:

1. A computer housing adapted for mounting first and second interface cards, said computer housing comprising:
   a housing body including a first mounting hole portion formed through said housing body in a direction corresponding to an axis of said first interface card and adapted for mounting of the first interface card, a second mounting hole portion formed through said housing body in a direction corresponding to an axis of said second interface card and adapted for mounting of the second interface card and extending in a direction different from an extension direction of said first mounting hole portion, and two first fixing portions respectively disposed adjacent to said first and second mounting hole portions; and
   a positioning device including first and second positioning components that are pivoted to said housing body and that respectively have a second fixing portion,
   said first positioning component being pivotable relative to said housing body between a card retaining position, where said second fixing portion thereof engages a respective one of said first fixing portions and said first positioning component is disposed to be capable of blocking removal of the first interface card from said first mounting hole portion, and a card releasing position, where said second fixing portion thereof is disengaged from the respective one of said first fixing portions and said first positioning component is disposed to permit removal of the first interface card from said first mounting hole portion;
   said second positioning component being pivotable relative to said housing body between a card retaining position, where said second fixing portion thereof engages a respective one of said first fixing portions and said second positioning component is disposed to be capable of blocking removal of the second interface card from said second mounting hole portion, and a card releasing position, where said second fixing portion thereof is disengaged from the respective one of said first fixing portions and said second positioning component is disposed to permit removal of the second interface card from said second mounting hole portion.

2. The computer housing as claimed in claim 1, wherein said first mounting hole portion is a vertically extending mounting hole portion, and said second mounting hole portion is a horizontally extending mounting hole portion.

3. The computer housing as claimed in claim 2, wherein said first and second mounting hole portions are formed integrally on said housing body.

4. The computer housing as claimed in claim 2, wherein one of said first and second fixing portions is an engaging protrusion, and the other one of said first and second fixing portions is an engaging hole.

5. The computer housing as claimed in claim 1, wherein one of said first and second fixing portions is an engaging protrusion, and the other one of said first and second fixing portions is an engaging hole.

6. The computer housing as claimed in claim 1, each of the first and second interface cards including a bracket part, wherein each of said first and second mounting hole portions has a wall section for abutting against the bracket part of a respective one of the first and second interface cards, and each of said first and second positioning components is capable of abutting against the bracket part of a respective one of the first and second interface cards to block removal of the respective one of the first and second interface cards from said wall section of the corresponding one of said first and second mounting hole portions when said first and second positioning components are at the card retaining position.

* * * * *